US012729529B2

(12) United States Patent
Wedi

(10) Patent No.: US 12,729,529 B2
(45) Date of Patent: Sep. 8, 2026

(54) DRAIN DEVICE WITH AN ADJUSTABLE SUPPORT FOR A DRAIN COVER

(71) Applicant: wedi GmbH, Emsdetten (DE)

(72) Inventor: Stephan Wedi, Emsdetten (DE)

(73) Assignee: WEDI GMBH, Emsdetten (DE)

( * ) Notice: Subject to any disclaimer, the term of this patent is extended or adjusted under 35 U.S.C. 154(b) by 1175 days.

(21) Appl. No.: 17/771,055

(22) PCT Filed: Mar. 17, 2022

(86) PCT No.: PCT/EP2022/056950
§ 371 (c)(1),
(2) Date: Sep. 21, 2023

(87) PCT Pub. No.: WO2023/174541
PCT Pub. Date: Sep. 21, 2023

(65) Prior Publication Data

US 2024/0151023 A1 May 9, 2024

(51) Int. Cl.
*E03F 5/04* (2006.01)
*B01D 29/05* (2006.01)

(52) U.S. Cl.
CPC ............ *E03F 5/0408* (2013.01); *B01D 29/05* (2013.01)

(58) Field of Classification Search
None
See application file for complete search history.

(56) References Cited

U.S. PATENT DOCUMENTS 4,694,513 A * 9/1987 Kiziah .................. E03F 5/0408 285/136.1
2022/0298772 A1* 9/2022 Young ..................... E03F 5/041
2024/0151023 A1* 5/2024 Wedi ...................... B01D 29/05

FOREIGN PATENT DOCUMENTS

DE 102016112400 A1 1/2018
KR 100962021 B1 * 6/2010 ............... E03C 1/26

OTHER PUBLICATIONS

English Machine Language Translation of KR-100962021-B1 Dowloaded 2026.*

* cited by examiner

*Primary Examiner* — Robert J Popovics
(74) *Attorney, Agent, or Firm* — Laurence P. Colton; Smith Tempel Blaha LLC

(57) ABSTRACT

Drain devices for installation in a shower floor panel usually include a cover. To adjust the position of the cover after a floor covering has been applied, the drain device has an adjusting device with a receptacle for installation in the floor panel with a bearing surface and an inner contour which has an inner diameter, a retainer insertable into the receptacle for an extension element connected to the cover and which is movable in a horizontal direction, and a fixing element which can be attached to the receptacle and which allows the retainer to be moved vertically relative to the fixing element while allowing a play. As a result, the retainer and the cover are still movable after the floor panel has been installed and the cover is precisely adjustable relative to the floor covering after the latter has been applied to the floor panel.

10 Claims, 8 Drawing Sheets

10 / 11

100

12 / 13

16

14
66
15
30 / 33
19
25
17
45
44
49
43
40
100
12
10 / 11
20
16

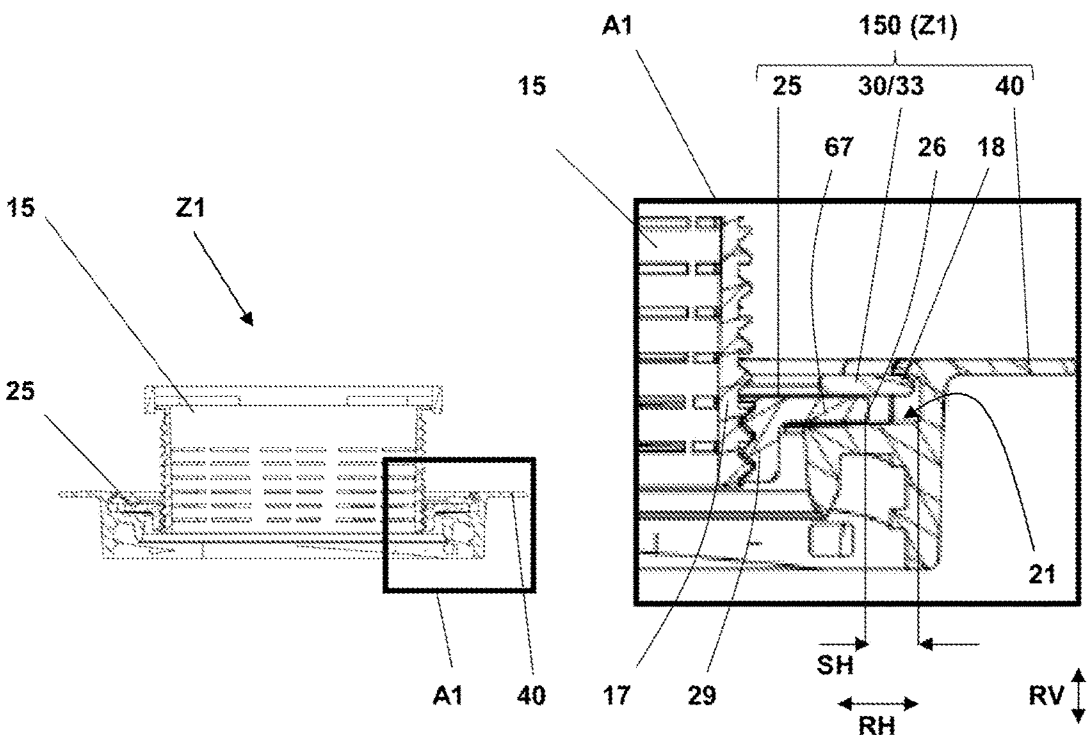
Fig. 4
Fig. 5
15
Z1
25
A1
40
150 (Z1)
30/33
67
26
18
21
17
29
SH
RH
RV
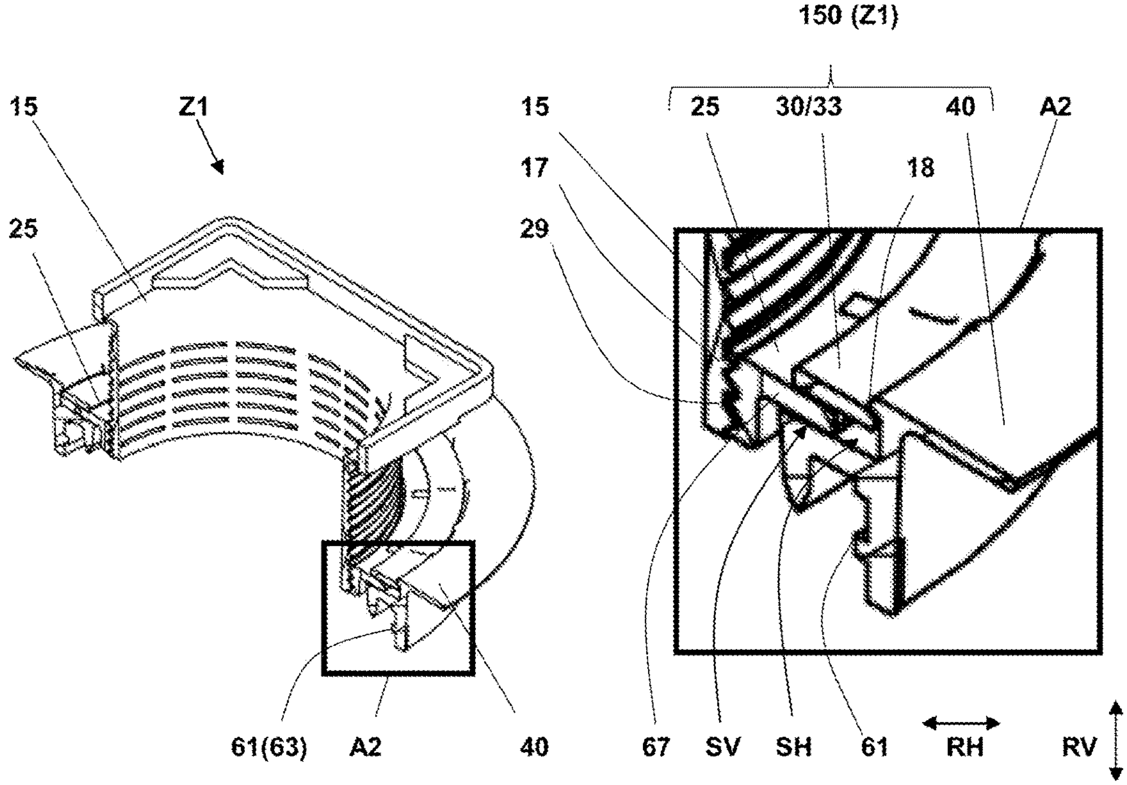
Fig. 6
Fig. 7
15
Z1
25
61(63)
A2
40
150 (Z1)
30/33
17
29
18
67
SV
SH
61
RH
RV

30 / 33
31
19
34
34

30 / 33
32
19
34
34
36

47 100 40 45 58 46 46' 59

100 40 60 62 61 55 38 54 45 49 20 43 44 48 200

DRAIN DEVICE WITH AN ADJUSTABLE SUPPORT FOR A DRAIN COVER

CROSS REFERENCE TO RELATED APPLICATIONS

This patent application claims the benefit of and priority on International Application No. PCT/EP2022/056950 having an international filing date of 17 Mar. 2022.

BACKGROUND OF THE INVENTION

Technical Field

The invention relates to a drain device for installation in an opening of a floor panel, preferably a shower floor panel, as well as a floor panel having such a drain device.

Prior Art

In the present case, a floor panel is understood to be a system that can be integrated into a building structure and which collects water and feeds it to a drainage device integrated in the floor panel.

Such floor panels can be used for various applications. For example, they can be installed in sanitary areas, especially showers. However, they can also be used in other types of wet rooms with floor drains, for example in kitchens, in public buildings such as hospitals or in food processing operations such as large kitchens or slaughterhouses. Furthermore, they can also be used outdoors, for example on balconies and terraces.

Known from DE 10 2016 112 400 A1 is a shower floor which comprises a floor panel (support element 12) and a cover layer element 17. The cover layer element 17 may have a frame 20 with a shoulder 24 inserted into an opening. In this respect, the opening of the cover layer element coincides with a drain opening 13 provided in the support element 12, such that the shoulder 24 of the frame 20can be inserted into the drain opening 13. The cover layer element 17 and the support element 12 are assembled by gluing the two parts together. After assembly, the drain is fixed in its position. This also predefines the position of a cover that can be placed on the drain opening. Only if the cover and the cover layer element have the same center axis does a joint surrounding the cover have the same width on all sides. The disadvantage is that even small deviations of the two central axes from each other are visually noticeable, as the outer sides of the joints surrounding the cover are then of different widths.

BRIEF SUMMARY OF THE INVENTION

The object of the invention is to eliminate the described disadvantages and to propose a drain device with which a uniform joint pattern surrounding the drain can be realized in a simple manner.

This object is achieved by a drain device for installation in an opening of a floor panel, preferably a shower floor panel, comprising an upper inlet opening, through which waste water can inter the drain device, a cover delimiting the upper inlet opening, which is supported by an extension element, and parts that can be pre-assembled in the floor area, which can be connected in a fluidic manner to a drain pipe, so that waste water which has passed through the inlet opening can enter the drain pipe, characterized in that the drain device furthermore has an adjusting device, wherein the adjusting device comprises the following components: a receptacle for installation in the floor panel with a bearing surface and an inner contour which has an inner diameter, a retainer insertable into the receptacle for the extension element, wherein the retainer has an outer contour, an upper side and a lower side, and wherein the outer contour has an outer diameter which is smaller than said inner diameter of the receptacle, so that the retainer inserted into the receptacle is movable in a horizontal direction within a horizontal range of play in the pre-assembled state, and a fixing element which can be attached to the receptacle and which has an upper side and a lower side and which allows the retainer to be moved vertically relative to the fixing element in the pre-assembled state while allowing a play (SV), so that in the pre-assembled state of the receptacle, retainer and fixing element, the retainer is freely movable in the receptacle within a vertical play and a horizontal play.

The drain device comprises:

- an upper inlet opening, through which waste water can enter the drain device,
- a cover delimiting the upper inlet opening, which is supported by an extension element, and
- parts that can be pre-assembled in the floor area, which can be connected in a fluidic manner to a drain pipe, so that waste water that has passed through the inlet opening can enter the drain pipe.

The cover can be a part made of plastic or metal that has punctiform, linear or otherwise designed openings for the passage of waste water. Waste water in this context is understood to be any type of liquid that is to be discharged through the drain. The waste water can therefore be, for example, shower water (use in sanitary areas), rainwater (use in outdoor areas) or other liquids such as cleaning agents, suspensions, etc. The waste water can also be used for other purposes (use in the industrial sector).

The cover can be mounted directly on the extension element. However, other parts, such as intermediate supports, can also be arranged between the extension element and the cover.

The drain device further comprises an adjusting device comprising the following components:

- a receptacle for installation in the floor panel with a bearing surface and an inner contour which has an inner diameter,
- a retainer insertable into the receptacle for the extension element of the cover, wherein the retainer has an outer contour, an upper side and a lower side, and wherein the outer contour has an outer diameter which is smaller than said inner diameter of the receptacle, so that the retainer inserted into the receptacle is movable in a horizontal direction within a horizontal range of play in the pre-assembled state, and
- a fixing element which can be attached to the receptacle and which has an upper side and a lower side and which allows the retainer to be moved vertically relative to the fixing element in the pre-assembled state of the adjusting device while allowing a play.

The aforementioned pre-assembled state of the adjusting device refers to the state in which the receptacle, retainer and fixing element are located after the retainer has been inserted into the receptacle and fixed by means of the fixing element, leaving some play. The adjusting device assembled in this way is part of the drainage device. In this drainage device, the retainer inserted in the receptacle is movable until it is finally fixed in its final position (assembled state) after the drainage device has been installed in a floor panel and the floor panel has been installed in a designated location and after fine adjustment relative to the surrounding floor covering.

In the pre-assembled state, the receptacle and the fixing element form a kind of housing around the retainer. The retainer is thus freely movable in this housing-like structure within a vertical play and a horizontal play.

In contrast to the prior art solutions, this mobility of the retainer enables fine adjustment of the cover in relation to the floor surrounding the cover after gluing on a floor covering. If the floor covering is, for example, tiles, it is sufficient to initially apply the tiles with a relatively large tolerance so that the drain is arranged relatively roughly within an area left free in the floor covering. Specifically, there is a tolerance range when applying the floor covering because the width of the joints surrounding the drain is not determined when the tiles are laid, but by finely adjusting the drain after the floor covering has been applied. The aforementioned tolerance range is as large as the play of the cover plate retainer in relation to the receptacle.

After the floor covering has been glued on, the components relevant for the mobility of the retainer—and thus for the mobility of the cover directly or indirectly coupled to the retainer—are still in the pre-assembled state. The retainer and the cover directly or indirectly coupled to the retainer can be very easily aligned or finely adjusted manually within the provided range of play, either by eye or with the aid of spacers, in relation to the surrounding floor covering.

After this fine adjustment, the position of the cover support can be finally fixed by filling the joints, which are now evenly aligned at an equal width, with a suitable adhesive or mortar. After the final gluing of the drainage device in the floor covering, the retainer is fixed in the receptacle and the previously existing play no longer exists. The drainage device is then in the assembled state.

Preferably, the horizontal play of the retainer in relation to the receptacle in the pre-assembled state is at least 1 mm in the horizontal direction, most preferably 3 mm to 8 mm. A play selected in this way is sufficient to allow the desired fine adjustment and is also adapted to the joint widths provided for in DIN 18 157. Regardless of whether stoneware, porcelain stoneware or ceramic tiles are to be grouted, DIN 18 157 recommends a grout width that depends on the side length of the tile. Up to 150 mm side length, joints with a width of about 2 mm can be realized. For side lengths of 150 mm and longer, a joint width of at least 2 mm up to 8 mm should be chosen.

The vertical play of the retainer between the receptacle and the fixing element is preferably 0.1 to 2 mm. On the one hand, such a play is sufficient so that the retainer is not jammed by the fixing element, and on the other hand, it is small enough to keep the drain device flat overall in terms of its installation height. A flat installation height is particularly advantageous for shower floors that are intended for installation flush with the floor.

In a preferred embodiment, the retainer has an internal thread and the extension element for the cover has an external thread that can be screwed into the internal thread. This makes it possible to adjust the installation height of the extension element in relation to the floor panel. As the extension element supports the cover, the height of the top of the cover can be adjusted exactly to the height of the surrounding floor covering. The drainage device is therefore independent of the thickness of the floor covering used, or can be adapted to floor coverings of different thicknesses. The position of the cover can therefore be varied in the vertical direction in addition to its horizontal adjustability.

Preferably, the inner contour of the receptacle and/or the outer contour of the retainer are round. If both contours are round, the inner contour forms a smaller cylinder and the outer contour forms a larger cylinder, wherein the smaller cylinder is freely movable in the larger cylinder in the horizontal direction. If both contours are cylindrical, a play of the same size in all horizontal directions is realized in a small space.

The fixing element can preferably be a snap ring. A snap ring is easy to handle and reliably secures the position of the retainer in the housing.

The fixing element and the receptacle can be coupled to each other by means of a snap-in or snap-on connection. By means of the snap-in or snap-on connection, which can be designed to be detachable or non-detachable, the aforementioned components can be easily joined together in a form-fitting manner.

Preferably, the snap-in connection is formed by at least one projection provided on the fixing element and at least one recess provided in the receptacle into which said projection can be snapped. During assembly, the projection deforms elastically and then hooks into the recess of the receptacle.

In a preferred embodiment, a recess is provided on the upper side of the retainer. Furthermore, it is provided that the fixing element has a projection which can be inserted into the recess and which is arranged inside the recess in the mounted state. This limits the play of the retainer in relation to the fixing element in the horizontal direction. The retainer—and thus also a cover coupled to the retainer—is thus no longer freely movable within the horizontal play initially provided. Instead, the initially existing play is limited again by the combination of the recess on the retainer and the projection on the fixing element. As a result, a retainer with a projection can only be moved as much as the size of the recess allows. The advantage of this limitation is that the cover retainer can still be moved in all horizontal directions in order to carry out the desired fine adjustment, but it can no longer be rotated. This prevents a cover extension element screwed into the retainer from being unscrewed from the retainer in the event of clumsy handling.

Furthermore, the fixing element and/or the retainer can have one or more openings for the passage of seepage water. The background to this is that in unfavorable cases, for example in the case of aged or otherwise defective joints, minute amounts of water in the floor covering, also known as seepage water, can get underneath the floor covering through the joints. They are then trapped there and dry out only with extreme difficulty.

In the drainage device described here, the extension element is screwed into the retainer. The retainer—and also the fixing element—thus surround the wastewater flow from the outside. This outer area borders on the joints surrounding the drainage device. By providing openings in the retainer and/or fixing element, it is possible to guide any seepage water from outside the drain through the openings and feed it into the wastewater flow. By diverting the seepage water, the risk of water damage in the screed and in the drain area as a whole is reduced.

The object of the invention is further achieved by a floor panel, preferably a shower floor panel, comprising a drainage device as taught herein. The drainage device can be completely or partially pre-mounted in the shower floor panel. Even with such a floor panel, the mobility of the cover according to the invention, or the mobility of the parts supporting and holding the cover with respect to the floor panel, is present in the pre-assembled state. This means that the floor panel can be installed first, then the floor covering can be applied and, after the floor covering has been applied, the cover can be precision-adjusted in relation to the surrounding floor covering and then finally fixed in the desired position by applying a bonding agent.

BRIEF DESCRIPTION OF THE DRAWINGS

Further measures improving the invention are illustrated in more detail below with the description of preferred embodiments of the invention with reference to the figures, which show:

FIG. 4 are some components of the drainage device which together form an adjusting device in a cut side view;

FIG. 5 is a detail enlargement from FIG. 4;

FIG. 6 are the components according to FIG. 4 in a sectional perspective view;

FIG. 7 is a detail enlargement from FIG. 6;

DETAILED DESCRIPTION OF PREFERRED EMBODIMENTS

Figures 1, 2:
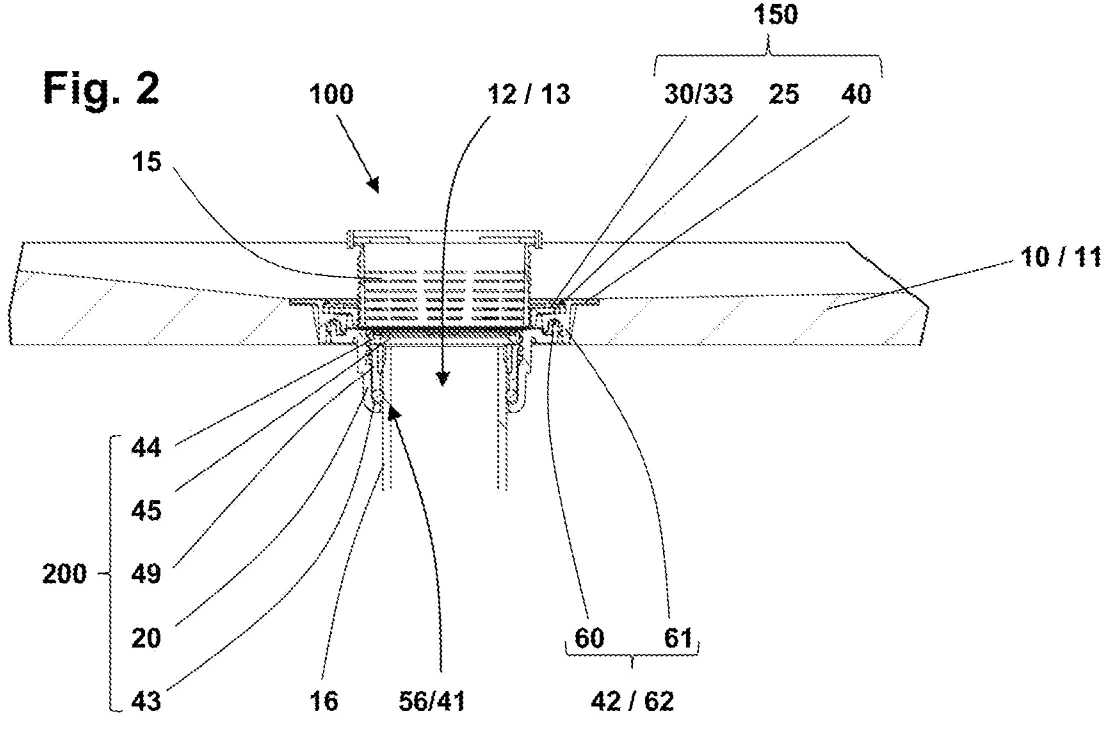
FIG. 1 is a drain device installed in a floor panel in a perspective sectional view.
FIG. 2 is the floor panel with drainage device according to FIG. 1 in a sectional side view.

In the following figures, identical or similar elements can be provided with identical or similar reference numbers. Furthermore, the figures of the drawing contain numerous features in combination in the description as well as in the claims. It is clear to a person skilled in the art that these features can also be considered individually or that they can be combined to form further combinations not described in detail here. The invention expressly extends also to such embodiments which are not given by combinations of features from explicit back references in the claims, whereby the disclosed features of the invention can be combined with each other in any way, inasmuch as this is technically reasonable. The exemplary embodiments shown in the figures thus have only a descriptive character and are not intended to limit the invention in any way.

Terms such as "upper", "lower", "below", "left", or "right" refer to the positioning of the components of the drain device as represented in the drawings which corresponds to the arrangement in the operating state.

FIG. 1 shows a drain device 100 installed in a floor panel 10 in a perspective sectional view. The floor panel 10 in the shown exemplary embodiment is a shower floor panel 11, which has a slope directed towards an inlet opening 13. Waste water entering through the inlet opening 13 is fed to a drain pipe system 16 connected to the drain device 100.

In the illustrated exemplary embodiment, the drain device 100 is installed in a sanitary room and is fitted in an opening 12 of the shower floor panel 11. The drain device 100 shown does not comprise an anti-odor trap integrated into the drain cup. In other exemplary embodiments, it may also be provided that the drain device itself comprises an anti-odor trap.

FIG. 2 shows the floor panel 11 with the drainage device 100 in a side sectional view. An adapter 200 is fitted onto the drain pipe 16 and fixed at a first coupling point 41 by means of a press-fit connection 56. At a second coupling point 42, the adapter 200 is screwed to a receptacle 40 by means of a screw connection 62. A bayonet catch 63 is integrated into the screw connection 62. The bayonet catch 63 facilitates the alignment of the components to be screwed together.

Further details of the adapter 200 are described in more detail below in relation to FIGS. 15 to 23.

Together with a retainer 25 and a fixing element 30, which in the present case is a snap ring 33, the receptacle 40 forms an adjusting device 150. The retainer 25 of the adjusting device 150 is connected to an extension element 15 via a thread. An intermediate support 66 may be arranged on the extension element 15, on which a cover 14 is provided for closing the inlet opening 13. The cover 14 can be removed to carry out cleaning and maintenance work. In the fully assembled state, the surface of the cover 14 is preferably aligned flush with the surface of a covering applied to the shower floor 11, which may be floor tiles, for example.

The flush fit of cover 14 to the surface of the shower floor covering is adjusted during installation of the shower floor 11. In FIG. 2, it can be seen that the extension element 15 clearly projects above the surface of the shower floor 11. This is due to the fact that the height of the extension element 15 in the initial stage is initially very generously dimensioned to also allow for the use of thick floor coverings. In order to roughly adjust the height of the extension element 15 to the height of a selected floor covering, the extension element 15 is therefore first shortened on its underside so that it is roughly adjusted to the height of the selected floor covering. The fine height adjustment, accurate to the millimeter or even to the tenth of a millimeter, is carried out by means of the threaded connection of extension element 15 and retainer 25 after the floor covering has been applied.

The adjusting device 150 provides, on the one hand, the described height adjustment and, on the other hand, a horizontal adjustment of the cover 14 for uniform alignment with respect to the joints surrounding the cover 14.

Figure 3:
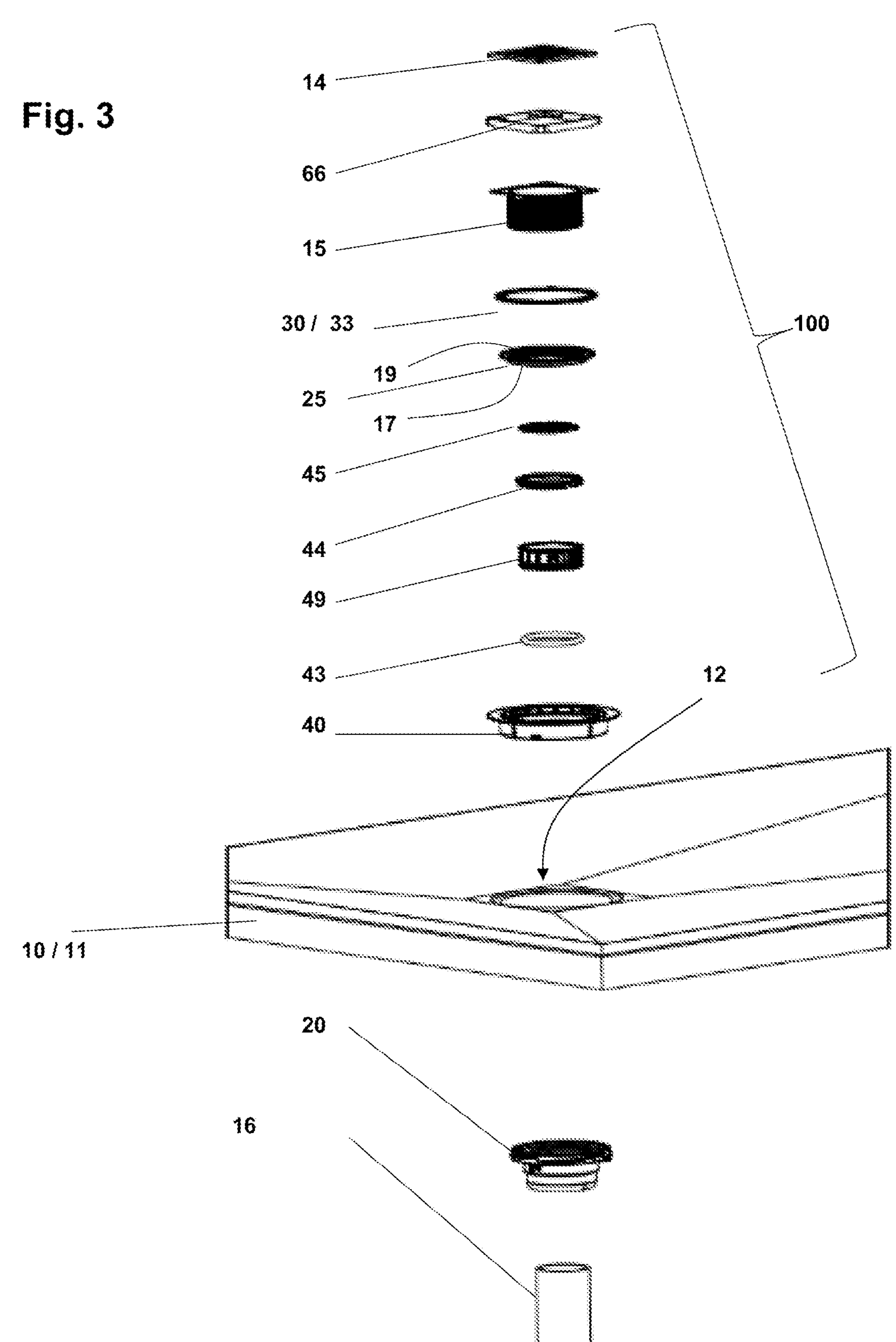
FIG. 3 is a floor panel and a drain device to be installed in the floor panel in an exploded view.

FIG. 3 shows an exploded view of the components of the drain device 100. The cover 14 can preferably be placed in a form-fitting manner on an intermediate support 66 provided in the illustrated embodiment. The intermediate support 66 may also have positive locking contours and is thus able to be placed on the extension element 15 in a form-fitting manner.

The extension element 15 has an external thread 17 that can be screwed into an internal thread 29 of the retainer 25.

The retainer 25 is held in a pre-assembled state Z1 in a housing-like structure and is movable in this housing-like structure. The housing-like structure is located in an area between the fixing element 30—in the present case: the snap ring 33—and the receptacle 40.

In the illustrated exemplary embodiment, the receptacle 40 can be inserted into the opening 12 of the floor panel 10 from above. To assemble the drain device 100, the retainer 25, the snap ring 33, the extension element 15, the intermediate support 66 and the cover 14 are also inserted into the drain device 100 from above and can be easily dismantled if necessary, for example for cleaning work.

In contrast, a base part 20 provided on the adapter 200 is first attached from below to the receptacle 40 already inserted in the floor panel 10. Next, the floor panel 10 with the inserted receptacle 40 and the base part 20 of the adapter 200 attached to the underside of the receptacle 40 can be fitted onto the drain pipe 16. The base part 20 is fixed to the drain pipe 16 by means of the press-fit connection 56 formed by the sealing ring 43, the spacer 49, the compression ring 44 and the insert 45. The exact functionality is explained in more detail below.

FIGS. 5 to 8 illustrate the construction and operation of the adjusting device 150, with FIG. 5 showing an enlarged section A1 from FIG. 4 and FIG. 7 showing an enlarged section A2 from FIG. 6.

The adjusting device 150 is shown in the pre-assembled state Z1. In this pre-assembled state Z1, the extension element 15 is screwed with its external thread 17 into the internal thread 29 of the retainer 25.

The retainer 25 has a circumferential flange 67 with an outer contour 26. In the pre-assembled state Z1, the flange 67 rests on a bearing surface 21 (cf. FIG. 12) provided in the receptacle 40. Above the flange 67, a snap ring 33 provided with projections 34 is engaged in recesses 23 of the receptacle 40 compatible with the projections 34. The projections 34 and the recesses 23 form a snap-fit connection 18 between the snap ring 33 and the receptacle 40.

Snap ring 33 and receptacle 40 thus form a housing-like structure that has approximately the shape of a horizontal U or a circumferential groove that is open towards the center axis. This groove surrounds the flange of the retainer 25 in the pre-assembled state Z1. The retainer 25—and thus also the extension element 15—are movable in horizontal direction RH and vertical direction RV within the groove. This mobility is indicated by a horizontal play SH, which in the illustrated embodiment is 5 mm, and a vertical play SV, which is less than 1 mm and serves to prevent jamming of the flange 67 between the snap ring 33 and the receptacle 40.

The horizontal and vertical play is maintained until a floor covering is applied to the shower floor panel 11. This means: In the course of the installation activities, the floor panel 10 and the drain device 100 are installed first. After the floor panel is in place and connected to the pipe 16, a floor covering (not shown in the drawings) is applied to the floor panel. After the floor covering has been applied, the height of the cover 14 placed on the extension element 15 can be adjusted exactly to the height of the floor covering by screwing the extension element 15 into the retainer 25. Furthermore, the horizontal positioning of the cover 14 can also be finely adjusted, since the adjusting device 150 is still in the pre-assembled state Z1 at this point.

After the position of the cover 14 has been finely adjusted in the vertical and horizontal directions RV, RH, the remaining open joints around the cover 14 are then finally grouted with a suitable mortar. This transfers the adjusting device 150 from the pre-assembled state Z1 to a fully assembled state. In the fully assembled state, the adjusting device 150 is thus fixed and only the cover 14 can still be removed from its holder.

Figures 8, 9, 10:
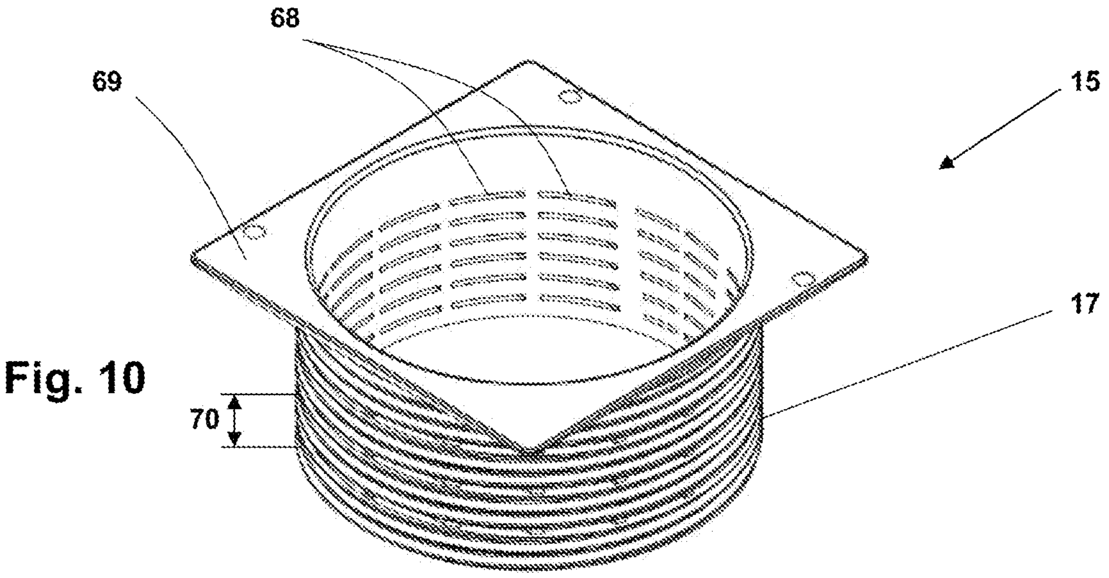
FIG. 8 is a fixing element in the form of a snap ring in a top view.
FIG. 9 is the fixing element according to FIG. 8 in a view from below.
FIG. 10 is an extension element for a cover in a perspective view.

FIGS. 8 and 9 show a fixing element 30 in the form of a snap ring 33 in a perspective view from diagonally above (FIG. 8) and diagonally below (FIG. 9). In the exemplary embodiment shown, the snap ring 33 is made of a flexible plastic and includes four projections 34 that are insertable into the compatible recesses 23 of the receptacle 40 to form a snap-fit connection 18. Furthermore, the snap ring 33 has some continuous openings 19 which, in the fully assembled state, serve to drain off seepage water entering the drain.

FIG. 9 also shows a projection 36 which is provided on the underside 32 of the snap ring 33 and which, in the pre-assembled state Z1 of the adjusting device 150, is arranged in a recess 35 provided in the retainer 25, where it limits the horizontal play SH of the retainer 25.

FIG. 10 shows the extension element 15, which has a tube-like contour with an external thread 17 and a flange 69 adjoining the tube-like contour. Openings 68 are made in the tube-like contour, which serve to drain off seepage water in the same way as the openings 19 in the snap ring 33. The tube-like contour can be shortened by a piece of length 70 at the installation site, for example with a cutter knife, in order to adapt it to the thickness of the floor covering to be applied.

Figure 11:
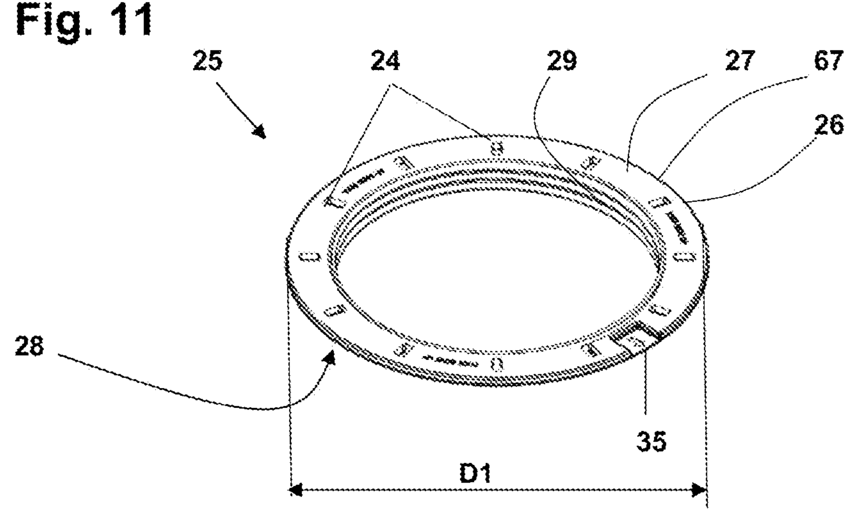
FIG. 11 is a retainer for the extension element shown in FIG. 10 in a perspective view.

FIG. 11 shows the retainer 25, which also has openings 24 for the drainage of seepage water. The retainer 25 has an internal thread 29 into which the extension element 15 can be screwed. Furthermore, the retainer 25 comprises the aforementioned recess 35 for limiting its movement in horizontal direction RH. The retainer 25 further comprises a flange 67 with a circular outer contour 26. The outer contour 26 has a diameter D1 which is smaller than a diameter D2 of the receptacle 40. The retainer 25 can thus be inserted into the receptacle 40.

Figure 12:
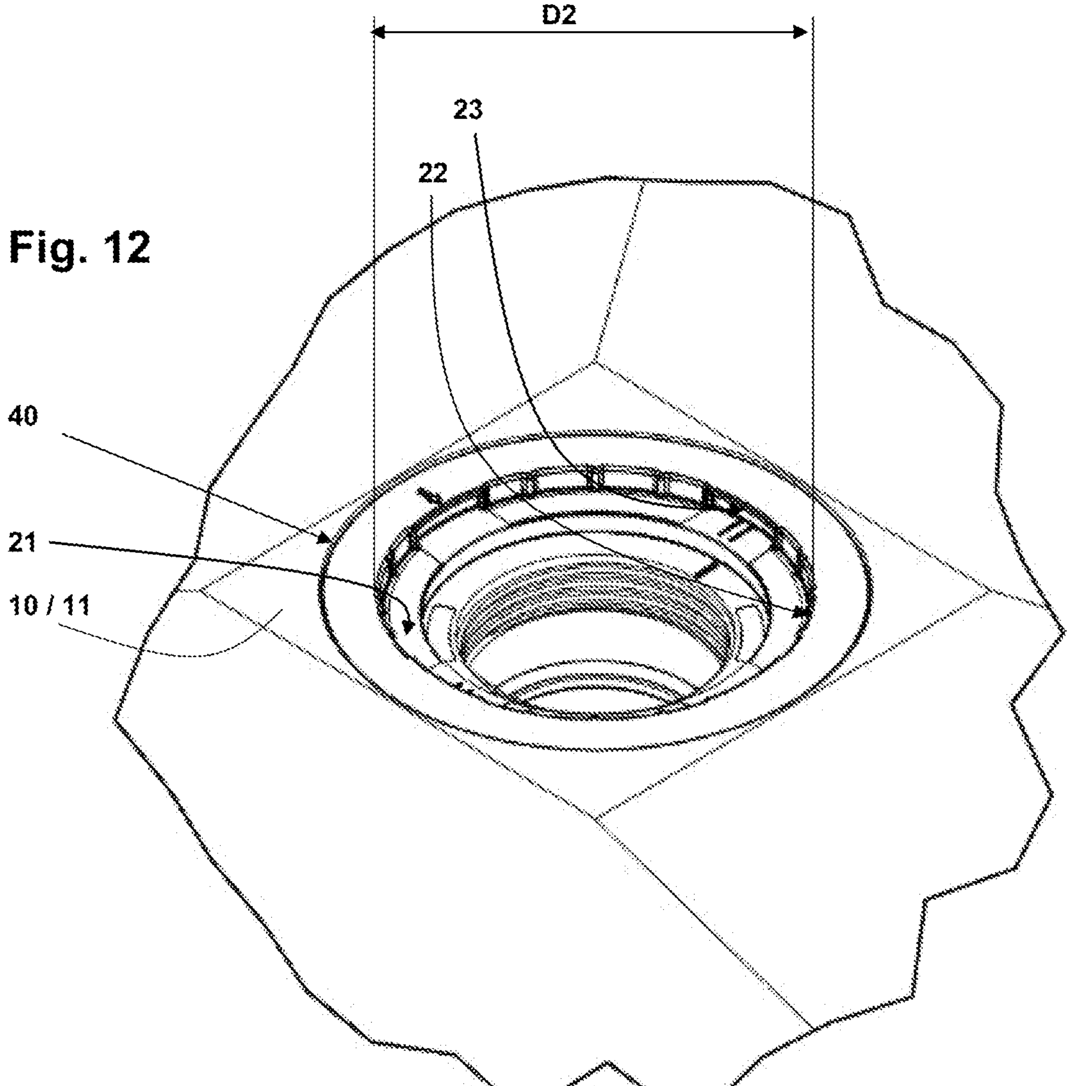
FIG. 12 is a receptacle built into a floor panel in a perspective view.
Figure 13:
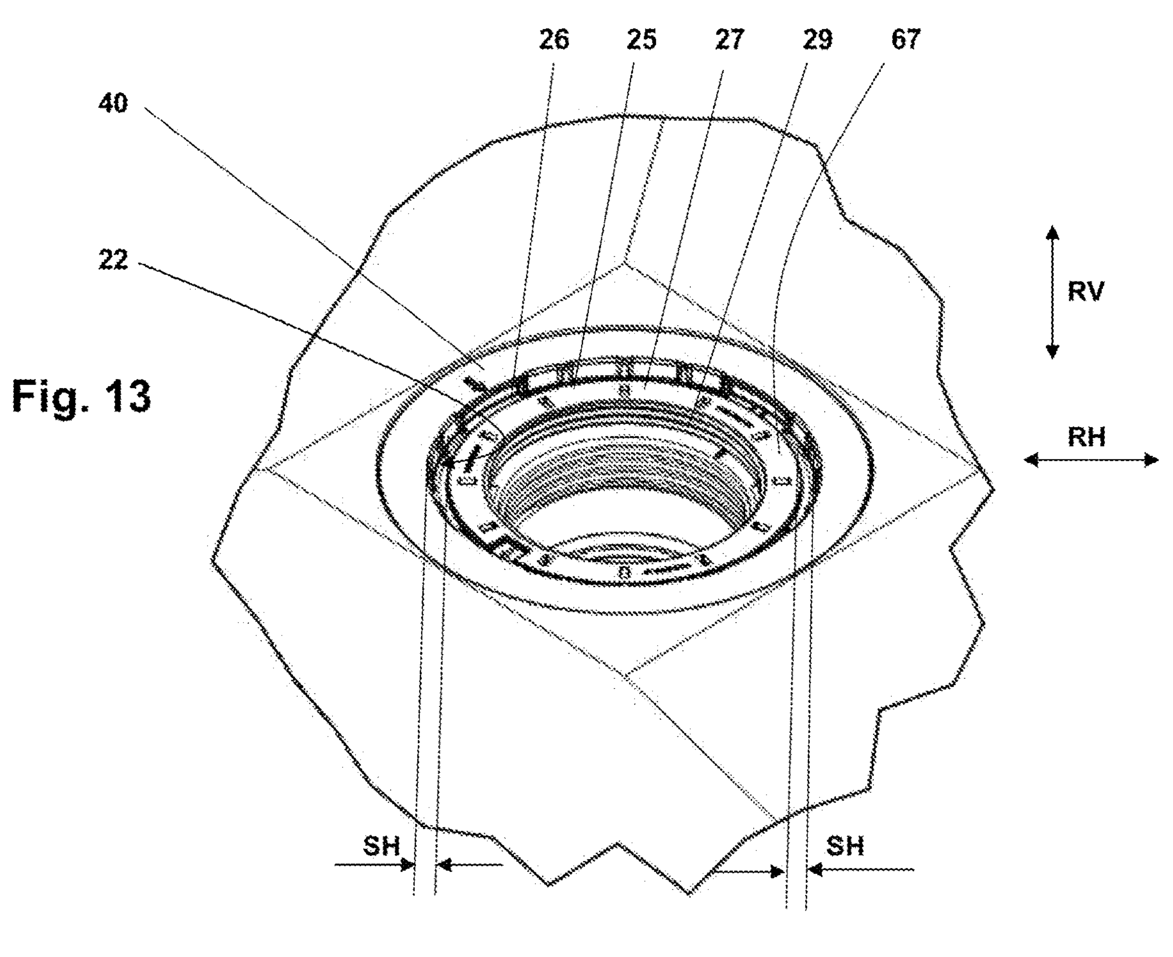
FIG. 13 is a perspective view of the receptacle according to FIG. 12 with the retainer installed according to FIG. 11.
Figure 14:
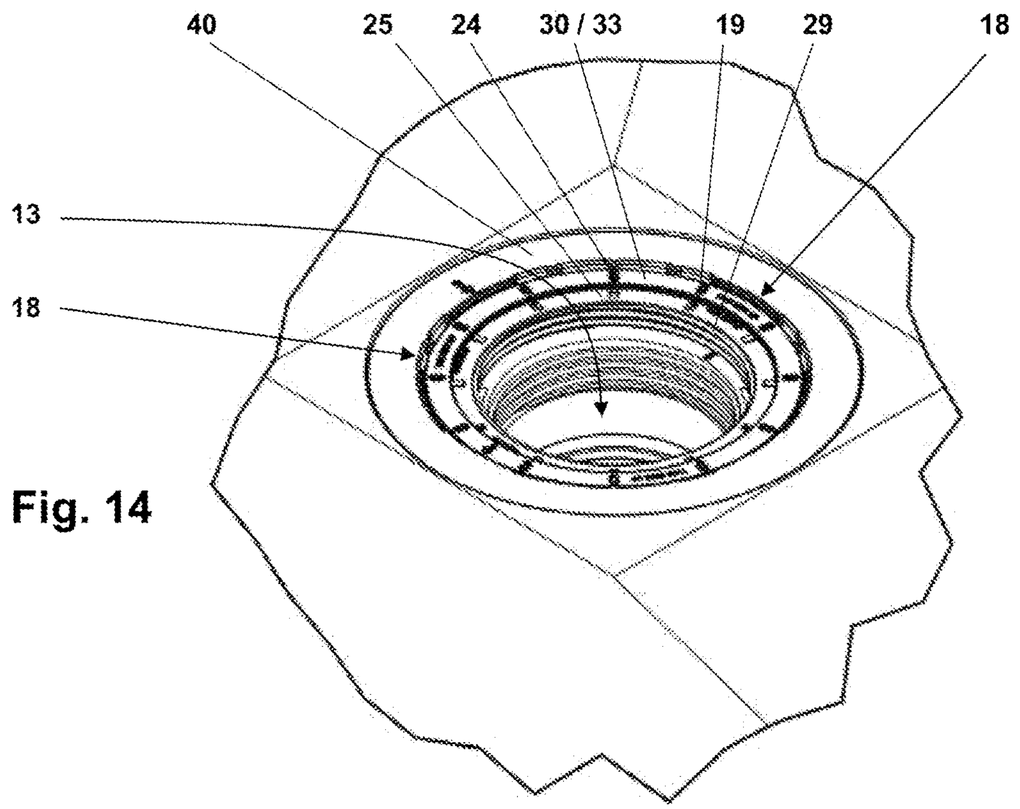
FIG. 14 is a perspective view of the receptacle with retainer and snap ring in the pre-assembled state.

FIGS. 12 to 14 show the shower floor panel 11 with inserted receptacle 40 in various stages of pre-assembly.

In FIG. 12, only the receptacle 40 is inserted into the opening 12 of the floor panel 10. From the lower side of the floor panel 10, the base part 20 of the adapter 200 is screwed to the receptacle 40. The receptacle 40 has an inner contour 22 with a bearing surface 21 and recesses 23.

FIG. 13 shows the receptacle 40 with the retainer 25 inserted. The retainer 25 rests with its flange 67 on the bearing surface 21 of the receptacle 40 and is movable in the horizontal direction RH within the horizontal play SH.

FIG. 14 shows the receptacle 40 with the snap ring 33 mounted. The snap ring 33 is detachably connected to the receptacle 40 via the snap-fit connection 18. This installation situation represents the pre-assembled state Z1, in which the retainer 25 (not shown in FIG. 14) is movable in the housing-like structure formed by snap ring 33 and receptacle 40 and can thus be adjusted as required.

FIGS. 15 to 23 show the adapter 200 already mentioned above and its components. The adapter 200 serves to couple a water inlet inserted into the floor panel 10 to the drain pipe 16 in a watertight manner. The adapter 200 thus has two coupling points, namely the first coupling point 41, at which it is coupled to the drain pipe 16, and the second coupling point 42, at which it is coupled to the water inlet or to the receptacle 40 integrated in the water inlet (cf. FIG. 2).

In the illustrated exemplary embodiment, the drain device 100 comprises both an adjusting device 150 and an adapter 200. Further above, the details of the receptacle 40 with specific features for integrating an adjusting device 150 have already been described. However, with regard to the adjusting device 150, it is irrelevant whether a drain device on which the adjusting device 150 is to be used comprises an adapter 200. Analogously, with regard to the adapter 200, it is also irrelevant whether the drain device 100 comprises an adjusting device 150. Rather, both assemblies can be universally integrated into a drainage device either alone or together.

Figures 15, 16, 17, 18:
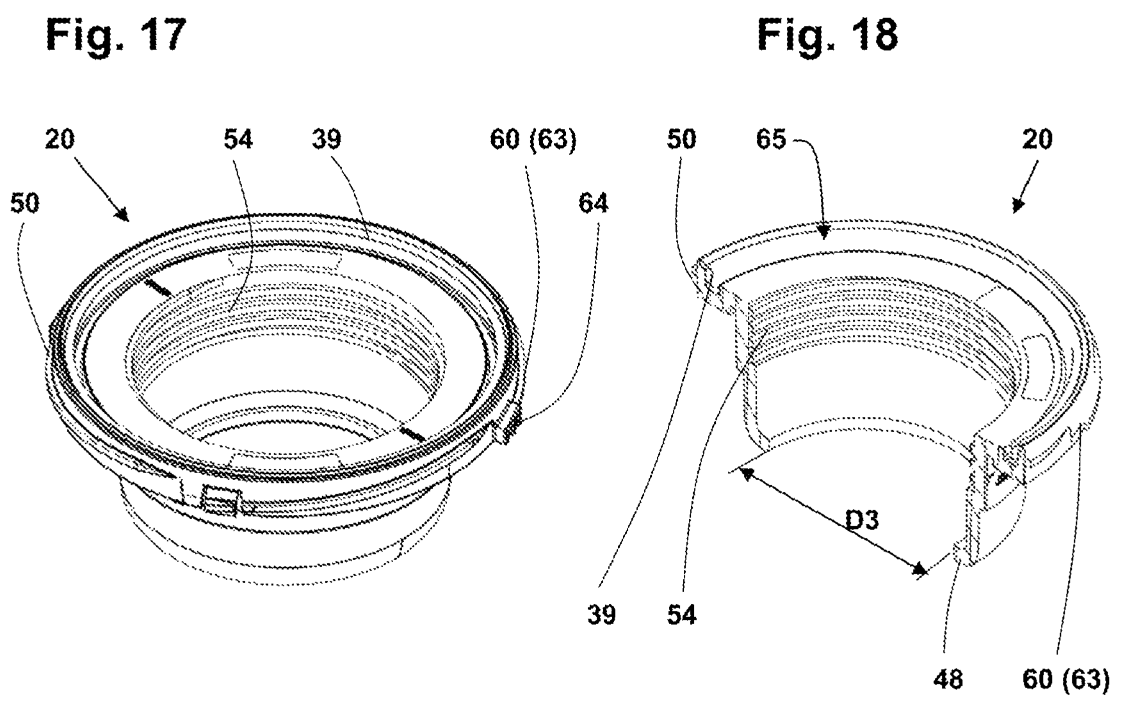
FIG. 15 is an adapter coupled to a receptacle in a perspective view.
FIG. 16 is a perspective sectional view of the adapter coupled to the receptacle according to FIG. 15.
FIG. 17 is the base part of the adapter in a perspective view.
FIG. 18 is the base part of the adapter according to FIG. 17 in a perspective sectional view.

FIGS. 15 and 16 show the drain device 100 which, on the one hand, comprises the adapter 200 and, on the other hand, is also intended to integrate an adjusting device 150. This is evident from the fact that the receptacle 40 shown in FIGS. 15 and 16 also comprises features of the adjusting device 150.

As already mentioned, the adapter 200 comprises two coupling points 41 and 42. The function of the adapter 200 in association with the first coupling point 41 is to produce a watertight connection between the base part 20 and the drain pipe 16. This fixed connection is the press-fit connection 56 already mentioned in reference to FIG. 2. In a simple embodiment, it can be provided that the press-fit connection 56 with respect to the drain pipe 16 is realized solely by an adapter with the components base part 20, sealing ring 43 and compression ring 44. In the exemplary embodiment shown, however, the adapter 200 also comprises the spacer 49 and the insert 45.

The press-fit connection 56 is achieved by a screw connection 38. The screw connection 38 is formed by an internal thread 54 arranged on the base part 20 and an external thread 55 arranged on the compression ring 44. The compression ring 44 can thus be screwed into the base part 20. The base part 20 has a lower collar 48 on its underside with an inner diameter D3 that is smaller than an outer diameter D4 provided on the sealing ring 43. With a base part 20 fitted onto the drain pipe 16 with the sealing ring 43 arranged on the collar, the sealing ring 43 cannot therefore move downwards out of the base part 20. Rather, it is crimped when the compression ring 44 is screwed deep enough into the base part 20. By crimping the sealing ring 43, the aforementioned press-fit connection 56 can be realized.

In the exemplary embodiment shown in FIGS. 15 and 16, the adapter 200 further comprises the spacer 49 and the insert 45. However, these parts are not absolutely necessary for making the press-fit connection 56. Rather, the press-fit connection 56 can also be produced by pressing the compression ring 44 directly against the sealing ring 43 without the spacer 49 acting as a spacer. For this purpose, the compression ring could, for example, have a cylindrical contour similar to the contour of the spacer, so that the compression ring acts simultaneously as a spacer and as a pressing means.

The inclusion of an insert 45 in the adapter 200 is also not mandatory. The insert 45 is provided for screwing the compression ring 44 into the base part 20. This insert part 45 comprises connecting elements 46' for producing a positive connection 47 with compatible connecting elements 46 on the compression ring 44. In addition, the insert 45 comprises a receptacle 59, which in the exemplary embodiment shown is a slot for attaching a screwdriver. By means of the screwdriver, the insert 45 and the compression ring 44 coupled to the insert can be easily screwed into the base part 20.

The insert 45 thus forms an insertion aid. The compression ring 44 can also be screwed into the base part 20 without the insert 45. If an adapter 200 is to be used without an insert 45, the compression ring 44 could, for example, comprise a shoulder onto which a screwing-in tool can be placed directly, so that a sufficiently strong press-fit connection can be made without using an insert 45.

FIGS. 17 and 18 show the base part 20 of the adapter 200. At the lower end is the lower collar 48, which has the inner diameter D3. In the assembled state, the sealing ring 43 is arranged on the lower collar 48. Furthermore, it can be seen that the base part 20 has an upper collar 50 with a U-shaped recess 65 into which a seal 39 is glued.

The base part 20 has an external thread 60 arranged on the upper collar 50, which together with an internal thread 61 arranged on the receptacle 40 forms a screw connection 62 and thus the second coupling point 42. In order to seal this coupling point 42 in a watertight manner, the circular seal 39 glued into the base part 20 is provided in the exemplary embodiment shown. When the external thread 60 is screwed into the internal thread 61, i.e., when the base part 20 is screwed into the receptacle 40, the seal 39 is pressed against a circular contour provided in the receptacle 40. As the depth of engagement increases, the seal 39 is compressed to such an extent that water draining through the drain device 100 cannot exit the drain device 100 at the second coupling point 42, but rather the second coupling point 42 is reliably sealed.

The external thread 60 is arranged on the upper collar 50 of the base part 20 and comprises part of a bayonet catch 63. The other part of the bayonet catch 63 is integrated into the internal thread 61 of the receptacle 40 (cf. FIG. 7). A catch 64 is located on the upper collar 50, which then snaps into a recess provided on the receptacle 40 when the base part 20 is screwed sufficiently deep into the receptacle 40. The engagement of the catch 64 can be felt when it is twisted in, so that the person assembling the drain device 100 receives a haptic and/or acoustic signal that the predefined twisting depth has been reached. In addition, once the catch 64 has engaged, the base part 20 can only be unscrewed from the receptacle 40 if the catch 64 has previously been pushed out of the recess, for example by means of a screwdriver. The catch 64 thus secures the base part 20 against unintentional unscrewing.

Figure 19:
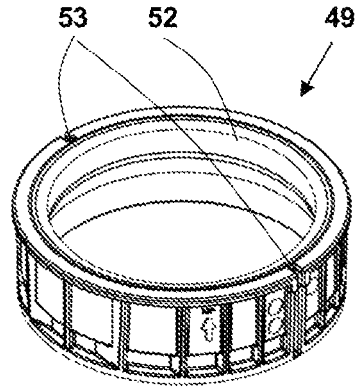
FIG. 19 is the spacer of the adapter in a perspective view.
Figure 20:
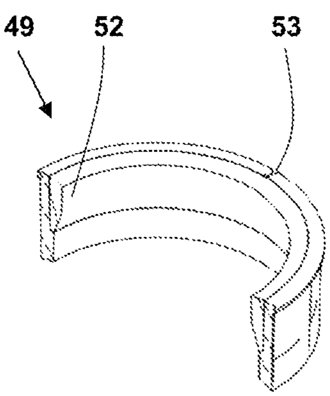
FIG. 20 is the spacer of the adapter according to FIG. 19 in a perspective sectional view.

FIGS. 19 and 20 show the spacer 49 provided in the exemplary embodiment shown. The spacer 49 has a cylindrical shape and acts as a distance piece between the compression ring 44 and the sealing ring 43. When the compression ring 44 is screwed in, the spacer 49 is inserted linearly along its central axis into the base part 20 and finally presses on the sealing ring 43. The sealing ring 43 in turn rests on the lower collar 48 of the base part 20 and is crimped by the screwing in of the compression ring 44, thus forming the press-fit connection 56. In the exemplary embodiment shown, the spacer 49 further comprises a bonded sealing ring 52 which is dimensioned to form a low resistance press fit with the drain pipe 16 when assembled.

The spacer 49 also has two nominal separation points 53 at which it can be easily separated into two half-shell-like individual parts, for example by means of a cutter knife. As already explained above, such a division of the spacer 49 is particularly helpful if a spacer 49 was inadvertently forgotten to be inserted into the base part 20 during assembly and, moreover, the upper inlet opening of the drain device 100 is too small to subsequently push the spacer 49 through and place it in the intended location. A spacer 49 divided into two half shells can thus also be pushed through an inlet opening that is too small for an undivided spacer 49.

Figure 21:
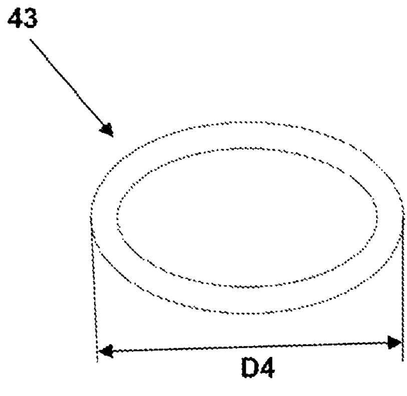
FIG. 21 is the sealing ring of the adapter in a perspective view.

FIG. 21 shows the sealing ring 43, which is a standard sealing ring made of a flexible material with an outer diameter D4.

Figure 22:
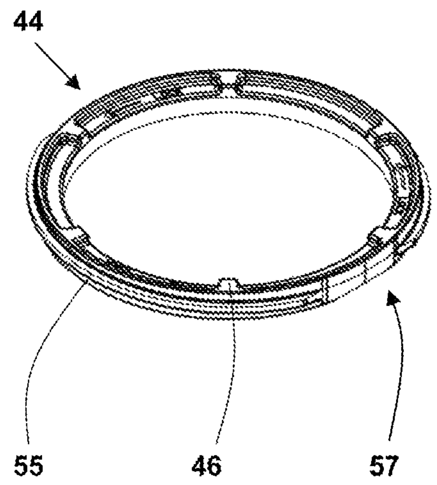
FIG. 22 is the compression ring of the adapter in a perspective view.

FIG. 22 shows the compression ring 44 with the connecting elements 46 arranged on the upper side for producing the form-fit connection 47 to the insert 45. Furthermore, a flattened area can be seen on the external thread 55, which forms part of the bayonet catch 63. The internal thread 54 of the base part 20, which is compatible with this external thread 55, also has a flattened area analogously. If the base part 20 and compression ring 44 are rotated with slight pressure and come into the position where the two flattened areas overlap, the bayonet catch 63 engages and thereby positions the base part 20 and compression ring 44 in relation to each other in such a way that the risk of canting—and thus: the risk of thread damage—is reduced.

Figure 23:
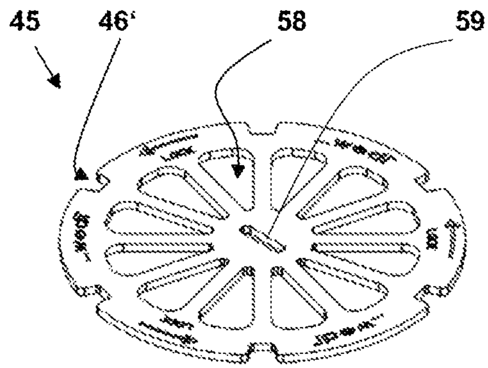
FIG. 23 is an insertable part that can be inserted into an adapter.

FIG. 23 shows the insert 45 with the connecting elements 46', which in the exemplary embodiment shown are U-shaped notches made in the outer contour. Furthermore, the insert 45 comprises openings 58 through which the waste water entering through the inlet opening can flow towards the drain pipe 16. The insert 45 is therefore not only used to screw in the compression ring 44, but rather can remain in the drain device 100 after the compression ring 44 has been screwed in. On the one hand, this ensures that the insert 45 is always there when disassembly is required, for example for maintenance work. On the other hand, the insert 45 has a sieve-like effect and reduces the risk of blockages in the drainage system.

On the insert 45 there are also arrows indicating the direction of rotation for screwing the compression ring 44 into the base part 20. In the present case, it is intended that the insert part 45—as seen in top view—is to be turned counter-clockwise in order to make the press-fit connection 56. However, if the insert 45 is rotated, some of the torque may be transmitted to the base part 20 under certain conditions, for example if the screw connection 38 is difficult to turn. It is therefore not impossible that the base part 20 rotates when the compression ring 44 is screwed into the base part 20. However, the base part 20 has the further screw connection 62 by means of which it is screwed into the receptacle 40. In order to prevent the screw connection 62 from being loosened when the compression ring 20 is screwed in, the directions of rotation of the two screw connections 38 and 62 are designed in such a way that when the compression ring 44 is tightened, in the case where part of the torque is transmitted to the screw connection 62, i.e. to the connection point to the receptacle 40, this second screw connection 62 is not loosened, but rather additionally tightened.

LIST OF REFERENCES

10 floor panel
11 shower floor panel
12 opening (in 10 or 11)
13 inlet opening (in 100)
14 cover (for 13)
15 extension element (for 14)
16 drain pipe
17 external thread (of 15)
18 snap-fit connection
19 opening (in 30)
20 base part (of 200)
21 bearing surface
22 inner contour (of 20)
23 recess (in 20)
24 opening (in 25)
25 retainer (for 15)
26 outer contour (of 25)
27 upper side (of 25)
28 underside (of 25)
29 internal thread (of 25)
30 fixing element
31 upper side (of 30)
32 underside (of 30)
33 snap ring
34 projection (on 30)
35 recess (in 25)
36 projection (on 30)
37 -
38 screw connection (of 44 and 20)
39 seal (in 20)
40 receptacle
41 first coupling point
42 second coupling point
43 sealing ring (in 200)
44 compression ring
45 insert (sieve)
46, 46' connecting element
47 connection (of 44 and 45)
48 lower collar (on 20)
49 spacer
50 upper collar (on 20)
51 pipe stub
52 seal (in 49)
53 nominal separation point (on 49)
54 interior thread (on 20)
55 external thread (on 44)
56 press-fit connection
57 bayonet catch
58 openings
59 receptacle (in 45)
60 external thread (on 20)
61 internal thread (on 40)
62 screw connection (of 20 and 40)
63 bayonet catch
64 catch
65 recess (on 20)
66 intermediate support (below 14)
67 flange (on 25)
68 openings (in 15)
69 flange (on 15)
70 length piece (on 15)
100 drain device
150 adjusting device
200 adapter
A1 section view (from FIG. 4)
A2 section view (from FIG. 6)
D1 outer diameter (of 25)
D2 inner diameter (of 40)
D3 inner diameter (of 48)
D4 outer diameter (of 43)
RH direction (horizontal)
RV direction (vertical)
SH horizontal play
SV vertical play
Z1 pre-assembled state

The invention claimed is:

1. A drain device (100) for installation in an opening (12) of a floor panel (10), the drain device (100) comprising:

an upper inlet opening (13), through which waste water can inter the drain device (100), a cover (14) delimiting the upper inlet opening (13), which is supported by an extension element (15), and an adjusting device (150) that can be pre-assembled in a floor area in which the drain device (100) is installed, wherein the adjusting device (150) can be connected in a fluidic manner to a drain pipe (16), so that waste water which has passed through the inlet opening (13) can enter the drain pipe (16), wherein the adjusting device (150) comprises the following components:

a receptacle (40) for installation in the floor panel (10) with a bearing surface (21) and an inner contour (22) which has an inner diameter (D2), a retainer (25) insertable into the receptacle (40) for the extension element (15), wherein the retainer (25) has an outer contour (26), an upper side (27) and a lower side (28), and wherein the outer contour (26) has an outer diameter (D1) which is smaller than said inner diameter (D2) of the receptacle (40), so that the retainer (25) inserted into the receptacle (40) is movable in a horizontal direction (RH) within a horizontal range of play (SH) in the pre-assembled state (Z1), and a fixing element (30) which can be attached to the receptacle (40) and which has an upper side (31) and a lower side (32) and which allows the retainer (25) to be moved vertically (RV) relative to the fixing element (30) in the pre-assembled state (Z1) while allowing a play (SV), so that in the pre-assembled state (Z1) of the receptacle (40), retainer (25) and fixing element (30), the retainer (25) is freely movable in the receptacle (40) within a vertical play (SV) and a horizontal play (SH), wherein the upper side (27) of the retainer (25) has a recess (35) and the fixing element (30) has a projection (36) that can be inserted into the recess (35) and which, in the pre-assembled state (Z1), is arranged inside the recess (35) and limits the play (SH) of the retainer (25) relative to the fixing element (30) in the horizontal direction (RH).

2. The drain device (100) as claimed in claim 1, wherein the horizontal play (SH) of the retainer (25) in relation to the receptacle (40) in the pre-assembled state (Z1) is at least 1 mm in the horizontal direction (RH).

3. The drain device (100) as claimed in claim 1, wherein the vertical play (SV) of the retainer (25) between receptacle (40) and fixing element (30) is 0.1 to 2 mm.

4. The drain device (100) as claimed in claim 1, wherein the retainer (25) has an internal thread (29) and the extension element (15) for the cover (14) has an external thread (17) that can be screwed into the internal thread (29), so that the installation height of the extension element (15) can be adjusted with respect to the floor panel (10).

5. The drain device (100) as claimed in claim 1, wherein the inner contour (22) of the base part (20) and/or the outer counter (26) of the retainer (25) are round.

6. The drain device (100) as claimed in claim 1, further comprising a snap ring (33) provided as the fixing element (30).

7. The drain device (100) as claimed in claim 1, wherein the fixing element (30) and the receptacle (40) can be connected by means of a snap-fit connection (18).

8. The drain device (100) as claimed in claim 7, wherein the snap-fit connection (18) is formed by at least one projection (34) provided on the fixing element (30) and at least one recess (23) provided on the receptacle (40), into which the projection (34) can be engaged.

9. The drain device (100) as claimed in claim 1, wherein the fixing element (30) has at least one opening (19) and/or the retainer (25) has at least one opening (24) for the passage of seepage water.

10. A floor panel (10) comprising a drain device (100) for installation in an opening (12) of a floor panel (10), the drain device (100) comprising:

an upper inlet opening (13), through which waste water can inter the drain device (100), a cover (14) delimiting the upper inlet opening (13), which is supported by an extension element (15), and an adjusting device (150) that can be pre-assembled in s floor area in which the drain device (100) is installed, wherein the adjusting device (150) can be connected in a fluidic manner to a drain pipe (16), so that waste water which has passed through the inlet opening (13) can enter the drain pipe (16), wherein the adjusting device (150) comprises the following components:

a receptacle (40) for installation in the floor panel (10) with a bearing surface (21) and an inner contour (22) which has an inner diameter (D2), a retainer (25) insertable into the receptacle (40) for the extension element (15), wherein the retainer (25) has an outer contour (26), an upper side (27) and a lower side (28), and wherein the outer contour (26) has an outer diameter (D1) which is smaller than said inner diameter (D2) of the receptacle (40), so that the retainer (25) inserted into the receptacle (40) is movable in a horizontal direction (RH) within a horizontal range of play (SH) in the pre-assembled state (Z1), and a fixing element (30) which can be attached to the receptacle (40) and which has an upper side (31) and a lower side (32) and which allows the retainer (25) to be moved vertically (RV) relative to the fixing element (30) in the pre-assembled state (Z1) while allowing a play (SV), so that in the pre-assembled state (Z1) of the receptacle (40), retainer (25) and fixing element (30), the retainer (25) is freely movable in the receptacle (40) within a vertical play (SV) and a horizontal play (SH), wherein the upper side (27) of the retainer (25) has a recess (35) and the fixing element (30) has a projection (36) that can be inserted into the recess (35) and which, in the pre-assembled state (Z1), is arranged inside the recess (35) and limits the play (SH) of the retainer (25) relative to the fixing element (30) in the horizontal direction (RH).

* * * * *